United States Patent [19]

Deguchi et al.

[11] 4,214,908
[45] Jul. 29, 1980

[54] DURABLE ANTI-FOGGING COMPOSITION

[75] Inventors: Katsuhiko Deguchi, Sakura; Junryo Mino, Kamagaya; Kaoru Tsujii, Sakura, all of Japan

[73] Assignee: Kao Soap Co., Ltd., Tokyo, Japan

[21] Appl. No.: 845,973

[22] Filed: Oct. 27, 1977

[30] Foreign Application Priority Data

Nov. 8, 1976 [JP] Japan .................. 51-134514

[51] Int. Cl.² .............................................. C09K 3/18
[52] U.S. Cl. .................................. 106/13; 260/29.6 B; 260/29.6 SQ; 260/29.6 MQ; 260/29.6 MN
[58] Field of Search ......................................... 106/13

[56] References Cited

U.S. PATENT DOCUMENTS

| | | | |
|---|---|---|---|
| 2,716,068 | 8/1955 | Fain et al. | 106/13 |
| 3,696,043 | 10/1972 | Labrage et al. | 106/13 |
| 3,856,534 | 12/1974 | Fletcher et al. | 106/13 |

Primary Examiner—J. Ziegler
Attorney, Agent, or Firm—Blanchard, Flynn, Thiel, Boutell & Tanis

[57] ABSTRACT

A durable anti-fogging agent composition comprises at least one sulfonic acid type amphoteric surface active agent represented by the following general formula (I):

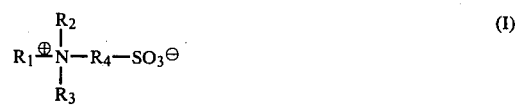

wherein $R_1$, $R_2$ and $R_3$ each stand for an alkyl, hydroxyalkyl or benzyl group, the sum of carbon atoms of the groups $R_1$, $R_2$ and $R_3$ is in the range of 16 to 38 and one of the groups $R_1$, $R_2$ and $R_3$ is an alkyl or hydroxyalkyl group having at least 14 carbon atoms, and $R_4$ stands for an alkylene or hydroxyalkylene group having 2 to 4 carbon atoms, and at least one member selected from inorganic salts and acetates represented by the general formulae MeSCN, MeNO₃, MeX and MeOOCCH₃ in which Me is a cation selected from Na, K, Li, NH₄, ½Ca and ½Mg and X is a halogen ion.

6 Claims, No Drawings

DURABLE ANTI-FOGGING COMPOSITION

BACKGROUND OF THE INVENTION

1. Field of the Invention

The present invention relates to a composition providing a high and durable anti-fogging effect on the surfaces of glass, plastics and polymeric films.

2. Description of Prior Arts

In general, the surfaces of glass, plastics and polymeric films readily become foggy with the condensation of water vapor, and the transparency disappears or uneven reflection is caused on the surfaces. This phenomenon of fogging causes various troubles. For example, fogging on front, side or rear glass windows of an automobile or on spectacles results in great inconvenience and sometimes causes an accident endangering life. Further, when show-windows become foggy, no intended exhibiting effect can be attained, and when a polymeric film or glass of an agricultural green house or a dormer or other window of an oridinary house becomes foggy, transmission of light is inhibited and the growth of plants is checked or their health is injured.

Anti-fogging agents comprising anionic surface active agents, silicone type surface active agents or tricresyl phosphates have heretofore been used as agents for preventing fogging. However, none of the known anti-fogging agents have a sufficient durability of the anti-fogging effect. In order to attain the anti-fogging effect, it is necessary to increase the free energy on the surface and render the surface easily wettable with water. For attaining this purpose, a surface active agent is generally coated on the surface. However, the surface active agent is readily separated from the coated surface when wetted with water and the intended anti-fogging effect cannot be attained.

SUMMARY OF THE INVENTION

The present invention provides an anti-fogging agent composition having a good durable anti-fogging effect, which is adsorbed on the surface very effectively and is not readily separated from the surface.

In accordance with the present invention, there is provided an anti-fogging agent composition comprising as indispensable components 0.05 to 30% by weight of at least one sulfonic acid type amphoteric surface active agent represented by the following general formula (I):

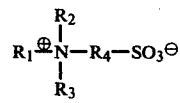

wherein $R_1$, $R_2$ and $R_3$ each stand for an alkyl, hydroxyalkyl or benzyl group, the sum of carbon atoms of the groups $R_1$, $R_2$ and $R_3$ is in the range of 16 to 38 and one of the groups $R_1$, $R_2$ and $R_3$ is an alkyl or hydroxyalkyl group having at least 14 carbon atoms, and $R_4$ stands for an alkylene or hydroxyalkylene group having 2 to 4 carbon atoms, and 0.01 to 20% by weight of at least one member selected from inorganic salts and acetates represented by the general formulae MeSCN, MeNO$_3$, MeX and MeOOCCH$_3$ in which Me is a cation selected from Na, K, Li, NH$_4$, ½Ca and ½Mg and X is a halogen ion, preferably Cl, Br or I. The balance of the composition is generally water.

This anti-fogging agent may further comprise as a third component 0.01 to 30% by weight of a nonionic surface active agent having an HLB value of 12 to 15 or 0.005 to 10% by weight of a water-soluble polymer composed of a maleic anhydridevinyl monomer copolymer.

The sulfonic acid type amphoteric surface acitve agent represented by the general formula (I), which is used in the present invention, may be prepared by reaction an α-hydroxyalkyldialkylamine derived from a tertiary alkylamine or α,β-alkylene epoxide with an alkane sultone or by reacting the α-hydroxyalkyldialkylamine with benzyl chloride or epichlorohydrin and sulfating the resulting product.

This first component is incorporated in the anti-fogging agent in an amount of 0.05 to 30% by weight, preferably 0.1 to 10% by weight.

An inorganic salt or acetate is used as the second component in the present invention, and this second component is selected from inorganic salts and acetates represented by the above-mentioned general formulae, for example, NaSCN, NaNO$_3$, KCl, LiBr, NH$_4$Cl, KI, MgCl$_2$, CaCl$_2$ and CH$_3$COONa. The second component is incorporated in the anti-fogging agent in an amount of 0.01 to 20% by weight, preferably 0.1 to 10% by weight.

The most characteristic feature of the present invention is that the anti-fogging agent composition has an excellent anti-fogging effect, which can be maintained for a long time. More specifically, the present invention is based on the finding that although the sulfonic acid type amphoteric surface active agent repesented by the general formula (I) has a very low water solubility and in general, it cannot be used as it is, if a specific inorganic salt or acetate is used as the second component in combination with this hardly water-soluble surface active agent, the solubility is drastically enhanced by interactions between the two components and the adsorption on the surface is remarkably improved. Further, when the anti-fogging agent is once adsorbed into the surface, it is prevented from falling out from the surface for a long time because of the low solubility thereof. Accordingly, an excellent anti-fogging effect can be manifested for a long time. In general, it is well known that surface active agents readily exhibit a so-called salting-out phenomenon, that is, the solubility is drastically reduced in the presence of a salt. According to the present invention, it has been found that sulfonic acid type amphoteric surface active agents such as represented by the above general formula (I) exhibit a so-called salting-in phenomenon, that is, the solubility is remarkably enhanced even in the presence of a salt, as observed in case of proteins. This salting-in phenomenon is peculiar because it has not been known in case of surface active agents. This salting-in phenomenon gives excellent dissolving, adsorbing and anti-fogging effects to the first component of the present invention. The inorganic salt or acetate acts as a kind of salt, giving charges to the sulfonic acid type amphoteric surface active agent, and it not only exerts a dissolution-promoting effect, but also manifests an anti-fogging effect synergistically with the sulfonic acid type amphoteric surface active agent. In other words, the inorganic salt or acetate as the second component has an interaction with the ionic portion of the sulfonic acid type amphoteric surface active agent and as a result, the adsorption and the anti-fogging effect are synergistically improved.

As the nonionic surface active agent having an HLB value of 12 to 15, that is used as the third component in the present invention, those represented by the following general formula (II):

$$RO(CH_2CH_2O)_nH \quad (II)$$

wherein R stands for an alkyl group having 10 to 16 carbon atoms, an alkenyl group having 14 to 18 carbon atoms or an octylphenyl or nonylphenyl group, and n is the number of moles of added ethylene oxide, which should be determined so that the HLB value may be in the range of 12 to 15,
are preferred. The nonionic surface active agent is incorporated in an amount of 0.01 to 30% by weight, preferably 0.1 to 10% by weight.

As the water-soluble polymer composed of a maleic anhydride-vinyl monomer copolymer, that is used as the third component, there can be mentioned, for example, a maleic anhydride-acetalized vinyl alcohol copolymer, a maleic anhydride-vinyl alcohol copolymer, a maleic anhydride-ethylene copolymer, a maleic anhydride-styrene copolymer, a partially saponified product thereof, a maleic anhydride-methyl vinyl ether copolymer, a partially saponified product thereof, a maleic anhydride-diisobutylene copolymer and a partially saponified product thereof. It is preferred that the average degree of polymerization of the water-soluble polymer be in the range of 500 to 1500. This water-soluble polymer is incorporated in an amount of 0.005 to 10% by weight, preferably 0.01 to 5% by weight. By incorporation of such third components the anti-fogging effect is enhanced, and moreover, the low temperature stability of the composition can be remarkably improved.

In order to improve the low temperature stability, it is preferred that up to 30% by weight of an alcohol having two or three carbon atoms, such as ethanol and propanol, be incorporated in the anti-fogging agent composition of the present invention. p Further, the anti-fogging agent composition of the present invention may be impregnated into paper, cloth, nonwoven fabric or the like and it may be used in the form of an anti-fogging paper or cloth.

The present invention will now be described in detail by reference to the following Examples.

EXAMPLE 1

An anti-fogging agent having the following composition was prepared:

| | |
|---|---|
| Amphoteric surface active agent (Table 1) | 1.0% by weight |
| Inorganic salt (Table 1) | 1.0% by weight |
| Ethanol | 10.0% by weight |
| Deionized water | balance |

The durability of the anti-fogging agent having the above composition was tested according to the following method to obtain results shown in Table 1.
(I) The outer wall of a clean glass beaker was dipped in the anti-fogging agent having the above composition, and it was dried with air.
(II) Cold water (maintained at 0° C.) was poured into the beaker and after 10 minutes, the fogginess on the outer wall of the beaker was examined with the naked eye.
(III) Cold water in the beaker was thrown away, and the outer wall of the beaker was dried with air again.
(IV) After drying, cold water was poured into the beaker again and the outer wall of the beaker was examined again.
(V) The above operations (I) to (IV) were repeated until no anti-fogging effect was observed.

In Table 1, the durability of the anti-fogging effect is expressed in terms of the number of cycles of repetition of the above operations conducted until no anti-fogging effect was observed. Accordingly, a larger value indicates a higher durability of the anti-fogging effect. From the results shown in Table 1, it will readily be understood that an especially good effect can be attained by the combined use of a sulfonic acid type amphoteric surface active agent and an inorganic salt. In Table 1, "control" means a composition in which a typical anionic surface active agent, sodium dodecyl sulfate ($C_{12}H_{25}OSO_3Na$), was incorporated in an amount of 2.0% by weight instead of the inorganic salt. When an amphoteric surface active agent was used alone, the durability of the anti-fogging effect was 1 or lower.

Table 1

| Amphoteric Surface Active Agent | Inorganic Salt | Durability of Anti-Fogging Effect (number of cycles) |
|---|---|---|
| Comparison | | |
| control | — | 1 |
| $C_{18}H_{37}(CH_3)_2N^+-O^-$ | NaSCN | 3 |
| $C_{18}H_{37}NH_2^+(CH_2)_2COO^-$ | " | 3 |
| $C_{18}H_{37}(CH_3)_2N^+(CH_2)_2COO^-$ | " | 3 |
| Present Invention | | |
| $C_{18}H_{37}(CH_3)_2N^+(CH_2)_2SO_3^-$ | " | 6 |
| $C_{18}H_{37}(OH)(CH_3)_2N^+(CH_2)_3SO_3^-$ | " | 9 |
| $C_{14}H_{29}(CH_2$$)(CH_3)N^+(CH_2)_3SO_3^-$ | " | 8 |
| $C_{14}H_{29}(CH_3)_2N^+(CH_2)_3SO_3^-$ | " | 6 |
| $C_{18}H_{37}(CH_3)_2N^+(CH_2)_3SO_3^-$ | " | 10 |
| " | $NaNO_3$ | 8 |
| " | NaCl | 7 |
| " | $Na_2SO_4$ | 6 |
| " | $CaCl_2$ | 8 |
| " | $Mg(NO_3)_2$ | 9 |

Table 1-continued

| Amphoteric Surface Active Agent | Inorganic Salt | Durability of Anti-Fogging Effect (number of cycles) |
|---|---|---|
| " | NaOOCCH$_3$ | 6 |

EXAMPLE 2

The durability of the anti-fogging effect and the low temperature stability were examined in composition formed by further incorporating a nonionic surface active agent into the composition illustrated in Example 1. Results obtained when $C_{18}H_{37}(CH_3)_2N^+(CH_2)_3SO_3^{31}$ was used as the amphoteric surface active agent and NaSCN was used as the inorganic salt are shown in Table 2. The recipe of the anti-fogging agent composition tested is as follows:

amined with the naked eye. The low temperature stability was evaluated according to the following scale:
◎: not changed
○: slightly turbid
△: considerably turbid
X: precipitates formed Table 2

| Nonionic Surface Active Agent | HLB Value | Durability of Anti-Fogging Effect (number of cycles) | Low Temperature Stability |
|---|---|---|---|
| Comparison | | | |
| control | — | 10 | △ |
| $C_{12}H_{25}O(CH_2CH_2O)_{4.8}H$ | 10.5 | 8 | X |
| Present Invention | | | |
| $C_{12}H_{25}O(CH_2CH_2O)_{9.3}H$ | 13.8 | 11 | ○ |
| $C_{18}H_{35}O(CH_2CH_2O)_{12.4}H$ | 13.6 | 12 | ◎ |
| 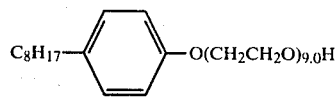 $C_8H_{17}$—⟨⟩—$O(CH_2CH_2O)_{9.0}H$ | 13.1 | 123 | ○ |
| 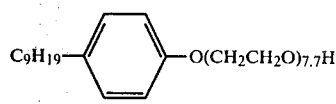 $C_9H_{19}$—⟨⟩—$O(CH_2CH_2O)_{7.7}H$ | 12.2 | 10 | △ |
| 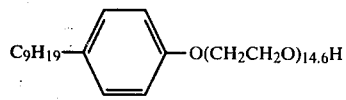 $C_9H_{19}$—⟨⟩—$O(CH_2CH_2O)_{14.6}H$ | 14.9 | 13 | ○ |
| 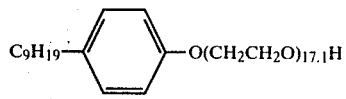 $C_9H_{19}$—⟨⟩—$O(CH_2CH_2O)_{17.1}H$ | 15.5 | 11 | △ |

| | |
|---|---|
| $C_{18}H_{37}(CH_3)_2N^+(CH_2)_3SO_3^-$ | 1.0% by weight |
| NaSCN | 1.0% by weight |
| Nonionic surface active agent (Table 2) | 0.5% by weight |
| Ethanol | 10.0% by weight |
| Deionized water | balance |

In Table 2, "control" means a composition having the same recipe as described above except that the nonionic surface active agent was not added.

From the results shown in Table 2, it is apparent that a nonionic surface active agent having an HLB value of 12 to 15 is very effective for improving the durability of the anti-fogging effect and the low temperature stability in the above anti-fogging agent composition.

The durability of the anti-fogging effect was evaluated according to the same method as described in Example 1. The low temperature stability was evaluated in the following manner.

The test composition was allowed to stand at −5° C. for one week and the state of the composition was ex-

EXAMPLE 3

The durability of the anti-fogging effect and the low temperature stability were examined in compositions formed by incorporating a water-soluble polymer instead of the nonionic surface active agent in the composition illustrated in Example 2. Obtained results are shown in Table 3. The recipe of the composition tested is as follows:

| | |
|---|---|
| $C_{18}H_{37}(CH_3)_2N^+(CH_2)_3SO_3^-$ | 1.0% by weight |
| NaSCN | 1.0% by weight |
| Water-soluble polymer (Table 3) | 0.01% by weight |
| Ethanol | 10.0% by weight |
| Deionized water | balance |

The durability of the anti-fogging effect and the low temperature stability were evaluated according to the same methods as adopted in Example 2.

In Table 3, "control" means a composition in which the water-soluble polymer was not added, and "P̄" means an average degree of polymerization in the water-soluble polymer.

From the results shown in Table 3, it is apparent that if a maleic anhydride copolymer is incorporated, the durability of the anti-fogging effect and the low temperature stability can be remarkably improved in the anti-fogging agent composition.

Table 3

| Water-Soluble Polymer | Durability of Anti-Fogging Effect (number of cycles) | Low Temperature Stability |
| --- | --- | --- |
| Comparison | | |
| control | 10 | Δ |
| polyvinyl alcohol (saponification degree 85% $\overline{P}=500$) | 6 | X |
| polyvinyl alcohol (saponification degree 90% $\overline{P}=600$) | 6 | X |
| polyacrylic acid ($\overline{P}=850$) | 5 | Δ |
| sodium polyacrylate ($\overline{P}=500$) | 6 | X |
| sodium polyacrylate ($\overline{P}=800$) | 5 | Δ |
| polyethylene glycol ($\overline{P}=400$) | 5 | X |
| polyethylene glycol ($\overline{P}=900$) | 6 | X |
| Present Invention | | |
| maleic anhydride-methyl vinyl ether copolymer ($\overline{P}=1000$) | 12 | O |
| maleic anhydride-ethyl vinyl ether copolymer ($\overline{P}=900$) | 12 | O |
| maleic anhydride-diisobutylene copolymer ($\overline{P}=1200$) | 13 | O |
| maleic anhydride-styrene copolymer ($\overline{P}=800$) | 12 | O |
| maleic anhydride-vinyl alcohol copolymer ($\overline{P}=1500$) | 11 | Δ |

EXAMPLE 4

A soft cloth was impregnated with an anti-fogging agent composition having the following recipe:

| | |
| --- | --- |
| $C_{18}H_{37}(CH_3)_2N^+(CH_2)_3SO_3^-$ | 1.0% by weight |
| NaSCN | 1.0% by weight |
| 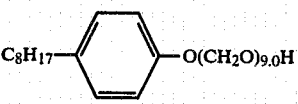 $C_8H_{17}$—⟨ ⟩—$O(CH_2O)_{9.0}H$ | 0.5% by weight |
| Ethanol | 10.0% by weight |
| Deionized water | balance |

The impregnated cloth was dried and the outer wall of a clean glass beaker was rubbed sufficiently with this cloth. Then, the durability of the anti-fogging effect was evaluated according to the method described in Example 1 to obtain results shown in Table 4. As will be apparent from the results shown in Table 4, the cloth has an anti-fogging effect even when it is used 20 times.

Table 4
Durability of Anti-Fogging Effect of Anti-Fogging Cloth

| Frequency (times) of Use of Anti-Fogging Cloth | Durability of Anti-Fogging Effect (number of cycles) |
| --- | --- |
| 1 | 6 |
| 5 | 4 |
| 10 | 3 |
| 15 | 2 |
| 20 | 1 |

What is claimed is:

1. A durable anti-fogging composition consisting essentially of 0.05 to 30% by weight of at least one sulfonic acid type amphoteric surface active agent having the formula (I):

$$R_1 \overset{\oplus}{\underset{R_3}{\overset{R_2}{N}}} - R_4 - SO_3^{\ominus} \quad (I)$$

wherein $R_1$, $R_2$ and $R_3$ each is alkyl, hydroxyalkyl or benzyl, the sum of the number of carbon atoms of $R_1$, $R_2$ and $R_3$ is in the range of from 16 to 38 and one of $R_1$, $R_2$ and $R_3$ is alkyl or hydroxyalkyl having at least 14 carbon atoms, and $R_4$ is alkylene or hydroxyalkylene having 2 to 4 carbon atoms; 0.01 to 20% by weight of at least one member selected from the group consisting of inorganic salts and acetates having the formulae MeSCN, MeNO$_3$, MeX and MeOOCCH$_3$ in which Me is a cation selected from the group consisting of Na, K, Li, NH$_4$, ½Ca and ½Mg and X is halogen; up to 30% by weight of alkanol having 2 or 3 carbon atoms; and the balance is water.

2. A durable anti-fogging composition as set forth in claim 1, which comprises 0.1 to 10% by weight of said sulfonic acid type amphoteric surface active agent and 0.1 to 10% by weight of said inorganic salt or acetate.

3. A durable anti-fogging composition as set forth in claim 1, wherein said inorganic salt is NaSCN, NaNO$_3$ or Mg(NO$_3$)$_2$.

4. A durable anti-fogging composition consisting essentially of 0.05 to 30% by weight of at least one sulfonic acid type amphoteric surface active agent having the formula (I):

$$R_1 \overset{\oplus}{\underset{R_3}{\overset{R_2}{N}}} - R_4 - SO_3^{\ominus} \quad (I)$$

wherein $R_1$, $R_2$ and $R_3$ each is alkyl, hydroxyalkyl or benzyl, the sum of the number of carbon atoms of $R_1$, $R_2$ and $R_3$ is in the range of from 16 to 38 and one of $R_1$, $R_2$ and $R_3$ is an alkyl or hydroxyalkyl having at least 14 carbon atoms, and $R_4$ is alkylene or hydroxyalkylene having 2 to 4 carbon atoms; 0.01 to 20% by weight of at least one member selected from the group consisting of inorganic salts and acetates having the formulae MeSCN, MeNO$_3$, MeX and MeOOCCH$_3$ in which Me is a cation selected from the group consisting of Na, K, Li, NH$_4$, ½Ca and ½Mg and X is halogen; up to 30% by weight of alkanol having 2 or 3 carbon atoms; and the balance is water.

5. A durable anti-fogging composition as set forth in claim 4 wherein said nonionic surface active agent has the formula (II):

$$RO(CH_2CH_2O)_nH \quad (II)$$

wherein R is alkyl having 10 to 16 carbon atoms, alkenyl having 14 to 18 carbon atoms, octylphenyl or nonylphenyl, and n is the number of moles of added ethylene oxide and is selected so that the HLB value is in the range of 12 to 15.

6. A durable anti-fogging composition as set forth in claim 4 which comprises from 0.1 to 10% by weight of said sulfonic acid type amphoteric surface active agent, from 0.1 to 10% by weight of said inorganic salt or acetate, and from 0.1 to 10% by weight of said nonionic surface active agent.

* * * * *

UNITED STATES PATENT AND TRADEMARK OFFICE
CERTIFICATE OF CORRECTION

PATENT NO. : 4 214 908
DATED : July 29, 1980
INVENTOR(S) : Katsuhiko DEGUCHI, Junryo MINO and Kaoru TSUJII It is certified that error appears in the above-identified patent and that said Letters Patent are hereby corrected as shown below:

Column 8, line 57; after "halogen;" insert
---0.01 to 30% by weight of a nonionic surface active agent having an HLB value of 12 to 15;---.

Signed and Sealed this

Twenty-eighth Day of October 1980

[SEAL]

Attest:

SIDNEY A. DIAMOND

Attesting Officer

Commissioner of Patents and Trademarks